E. J. FRASER.
PROCESS AND APPARATUS FOR REFINING AND PACKING SULPHUR.
No. 182,362. Patented Sept. 19, 1876
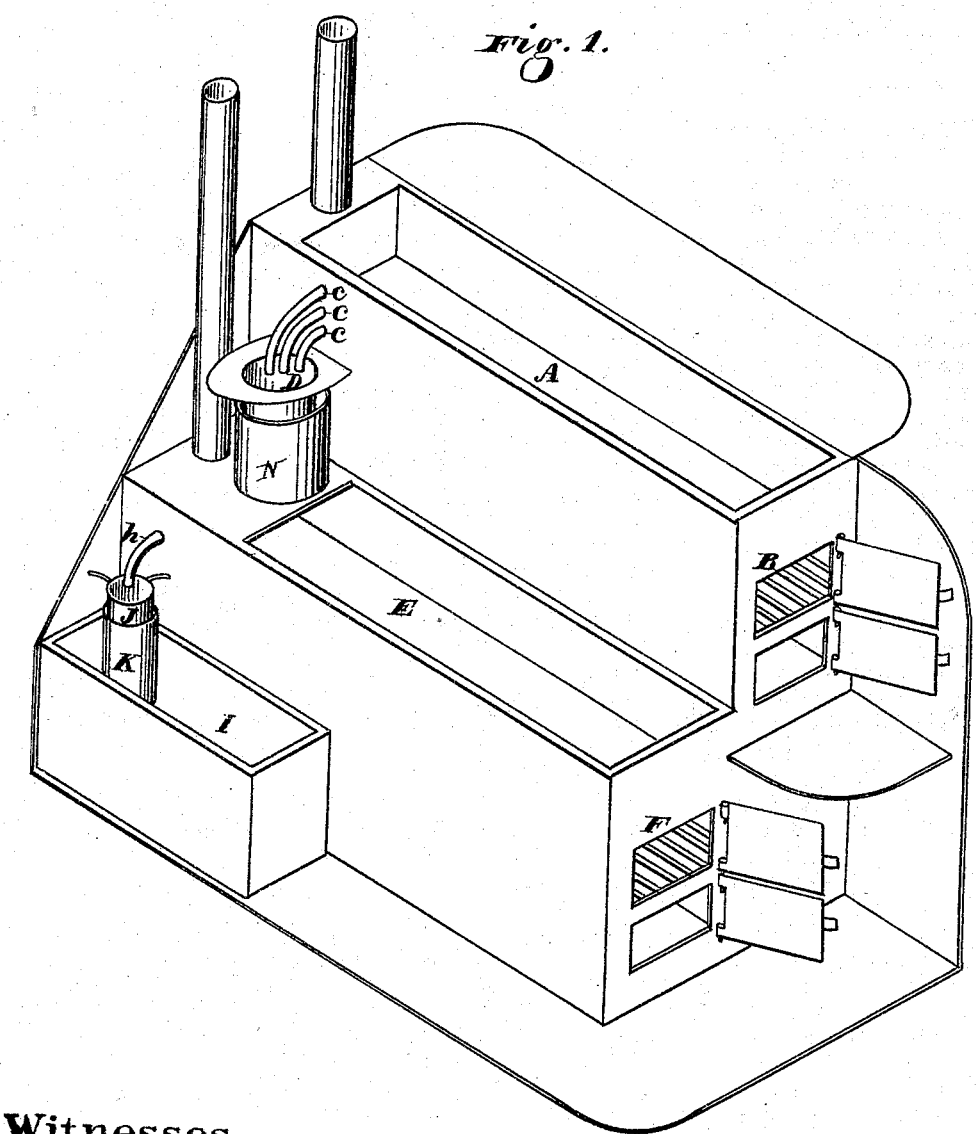

UNITED STATES PATENT OFFICE

EDWIN J. FRASER, OF SAN FRANCISCO, CALIFORNIA.

IMPROVEMENT IN PROCESSES AND APPARATUS FOR REFINING AND PACKING SULPHUR.

Specification forming part of Letters Patent No. 182,362, dated September 19, 1876; application filed May 16, 1876.

*To all whom it may concern:*

Be it known that I, EDWIN J. FRASER, of the city and county of San Francisco, State of California, have invented a Process and Apparatus for Refining and Packing Sulphur; and I do hereby declare the following description and accompanying drawings are sufficient to enable any person skilled in the art or science to which it most nearly appertains to make and use my said invention, without further invention or experiment.

My invention relates to an improved apparatus for producing merchantable sulphur from natural deposits of crude sulphur, or sulphur ore, my object being to provide a cheap and simple method of refining and packing the sulphur, so that its production in a suitable form and condition to render it merchantable can be accomplished at a small expense, and thus render the working of sulphur deposits profitable, even when the refined product commands a low price in the market. My invention also consists in an improved method of packing sulphur, as hereinafter described.

My improved process and apparatus are fully described in the following specification, and illustrated in the accompanying drawing.

In the drawing, Figure 1 is a perspective view of my machine.

Instead of separating and removing the sulphur from the matrix or gangue, with which it is intermixed in its natural state, by sublimation, and restoring the fumes to a solid form by condensation, as has heretofore been practiced, I accomplish the separation by fusion and settling, and then refine by passing the sulphur through suitable strainers, by which the gangue or earthy portion of the ore or crude sulphur is separated and the pure sulphur obtained.

The ore or crude sulphur as it comes from the mine I dump into a tank, A, under which is a furnace, B. A sufficient fire is maintained in this furnace to fuse the sulphur in the tank, and reduce it to a liquid form, so that the heavy impurities or gangue will settle to the bottom of the tank.

C C C are spouts through which the fused sulphur is drawn from the tank A, and deposited in a filtering-bag, D. This filtering-bag is suspended over a second tank, E, under which is also constructed a furnace, F, so that the strained sulphur will be received in the tank E, and kept in a liquid condition, so as to allow a further settling of the impurities.

The filter D, which I employ, is made of a textile fabric of sufficient porosity (such as common unbleached muslin) to allow the liquid sulphur to strain through its meshes or interstices, and yet retain the impurities or earthy matter in the bag. This style of a filter will serve an excellent purpose as long as it is kept heated, and the filtering operation is continued, but care must be taken not to allow the bag to become cool or chilled; otherwise its filtering quality is destroyed, and it must be thrown away. The tube N, inside of which the bag is suspended, prevents the air from striking its exterior and cooling it, while the heat from the fused sulphur in the tank keeps it in a properly-heated condition.

A filtering-bag made of this material will require to be removed and a fresh one substituted, however, when the impurities accumulate inside of it sufficiently to clog its interstices.

In the settling-tank E the heat of the furnace keeps the sulphur in a fluid condition, and, ordinarily, the settling is completed; but, if found desirable, other settling-tanks could be used. From the settling-tank the sulphur is drawn off through the spout $h$, and packed by my improved packing process, which is as follows: Outside of the settling-tank I place a tank, I, which I fill, or partially fill, with water. Over this tank I suspend a short tube or cylinder, J, so that the spout $h$, which draws the liquid sulphur from the settling-tank, will deliver it into the upper open end of the tube.

I then take a sack, K, which is made of common textile fabric, and dip it in water, so as to thoroughly saturate it, and then I draw its open end on over the tube J, so that its lower end will hang in the water in the water-tank. The liquid sulphur is then allowed to flow from the spout into the sack through the tube. As the sulphur strikes the wet sides of the sack it is instantly chilled and solidified, so as to form a shell on the inside of the sack, which prevents it from passing through the meshes of the cloth. The weight of the sulphur, as it accumulates, withdraws or forces the sack off of the tube, so that it settles into the water in the tank until it is filled. It is then removed from the tank and set away to solidify and cool.

This method of packing sulphur is extremely economical and convenient. The sacks, containing as they do a solid roll of sulphur, are easily handled, and none of the sulphur is wasted in case it should become broken.

The tanks are mounted one above another, as represented, so that the sulphur can be drawn directly from one into the other.

I thus produce a simple and very effective process for reducing, refining, and packing sulphur, which will be especially valuable when the deposit is largely composed of sulphur, as in several instances where it is found on the Pacific coast.

Having thus described my invention, what I claim, and desire to secure by Letters Patent, is—

1. In a sulphur-refining apparatus the upper tank A, having furnace B, and lower tank E, having furnace F, in combination with pipes $c\ c\ c$, textile strainer D, having protecting-cylinder N, and tube $h$, tank I, and cylinder J, all constructed, arranged in relation to each other, and operated as set forth.

2. The process of packing sulphur, the same consisting in running the fused sulphur into sacks which have previously been saturated or immersed in water, substantially as above described.

In witness whereof, I have hereunto set my hand and seal.

EDWIN J. FRASER. [L. S.]

Witnesses:
GEO. H. STRONG,
CHAS. G. PAGE.